United States Patent
Vornehm

(10) Patent No.: US 7,507,175 B2
(45) Date of Patent: Mar. 24, 2009

(54) POWER-BRANCHED CONTINUOUSLY VARIABLE TRANSMISSION

(75) Inventor: Martin Vornehm, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 318 days.

(21) Appl. No.: 11/393,382

(22) Filed: Mar. 30, 2006

(65) Prior Publication Data

US 2006/0264291 A1 Nov. 23, 2006

Related U.S. Application Data

(60) Provisional application No. 60/673,314, filed on Apr. 20, 2005.

(30) Foreign Application Priority Data

Mar. 31, 2005 (DE) ........................ 10 2005 014 631

(51) Int. Cl.
  *F16H 37/06* (2006.01)
(52) U.S. Cl. ........................ 475/36; 74/665 P
(58) Field of Classification Search ............... 74/665 B, 74/665 P; 475/36
  See application file for complete search history.

(56) References Cited

U.S. PATENT DOCUMENTS

| | | | | |
|---|---|---|---|---|
| 2,949,793 A | * | 8/1960 | Suri | 475/50 |
| 3,180,180 A | * | 4/1965 | Helfer et al. | 475/36 |
| 3,296,891 A | * | 1/1967 | Tuck | 475/36 |
| 3,435,707 A | * | 4/1969 | De Julian | 475/36 |
| 3,593,596 A | * | 7/1971 | Race et al. | 74/720 |
| 4,147,075 A | * | 4/1979 | Rasman et al. | 74/720 |
| 5,531,652 A | * | 7/1996 | Hall et al. | 475/36 |
| 5,720,686 A | * | 2/1998 | Yan et al. | 475/211 |
| 6,566,826 B2 | * | 5/2003 | Imai et al. | 318/11 |
| 7,150,698 B2 | * | 12/2006 | Sakamoto et al. | 477/5 |
| 2004/0224811 A1 | | 11/2004 | Vornehm | 475/207 |

FOREIGN PATENT DOCUMENTS

| DE | 102 47 174 A1 | 5/2003 |
|---|---|---|
| DE | 103 58 114 A1 | 7/2004 |

* cited by examiner

*Primary Examiner*—Ha D. Ho
(74) *Attorney, Agent, or Firm*—Alfred J. Mangels

(57) ABSTRACT

A power-branched continuously variable transmission having an input shaft and an output shaft, and a power divider transmission that divides the torque of the input shaft between two torque transmission paths. One path is connected to the output shaft. A variable speed drive unit connects the transmission paths with each other, and a start-up converter is located in one of the torque transmission paths between the power divider transmission and the variable speed drive unit.

10 Claims, 1 Drawing Sheet

POWER-BRANCHED CONTINUOUSLY VARIABLE TRANSMISSION

CROSS-REFERENCE TO RELATED APPLICATION

This application claims the benefit of copending provisional application Ser. No. 60/673,314, filed on Apr. 20, 2005.

BACKGROUND OF THE INVENTION

1. Field of the Invention

The present invention relates to a power-branched continuously variable transmission.

2. Description of the Related Art

Continuously variable transmissions, i.e., transmissions having a continuously variable transmission ratio, are being used more often in modern motor vehicles. To increase the transmission range, i.e., the spread of the transmission, and/or to relieve the variable speed drive unit, which is constructed in general as a frictional transmission, and particularly a belt-driven conical-pulley transmission, such continuously variable transmissions have been designed with power branching, as is described in German published patent applications DE 102 47 174 A1 or DE 103 58 114 A1, for example. Even when continuously variable transmissions are constructed with power branching, a start-up clutch, which is usually in the form of a hydrodynamic converter, is usually located at the transmission input between the shaft driven by a drive engine and the input shaft of the transmission The present invention has as an object the provision of a power-branched continuously variable transmission that operates with a variable speed drive unit having lower torque transmission capability, despite high start-up torque.

SUMMARY OF THE INVENTION

The object of the present invention is achieved with a power-branched continuously variable transmission that includes an input shaft and an output shaft, and a power divider transmission that divides the torque of the input shaft between two torque transmission paths. One path is connected to the output shaft, and a second path includes a variable speed drive unit that connects the torque transmission paths with each other. A start-up element is located in one of the torque transmission paths between the power divider transmission and the variable speed drive unit.

With the power-branched continuously variable transmission in accordance with the present invention, the variable speed drive unit is not subjected to higher torque despite increasing the start-up torque by means of the start-up element, so that the variable speed drive unit can be of a correspondingly more economical design and a smaller size Advantageously, the start-up element is designed as a hydrodynamic converter that preferably includes a lockup clutch.

Also advantageously, the start-up element is designed as an electrical converter, i.e., in the form of an electrical machine that is operable both as a generator that replaces electrical power and as a motor, The electrical converter preferably includes a lockup clutch. In the lockup state the electrical converter represents a large total electric machine with which the usual hybrid functions can be achieved, such as recuperation, boosting, and starting.

In a preferred embodiment of the transmission in accordance with the invention, the torque transmission path that contains the converter is connected to the output shaft.

Advantageously, the torque transmission path that contains the converter is connected to the output shaft through a transmission ratio stage Furthermore, in the torque transmission path that does not contain the converter, a transmission ratio stage is advantageously contained between the power divider transmission and the variable speed drive unit The power divider transmission can be designed as a planetary transmission, for example.

For double use of the spread of the variable speed drive unit, optionally the one or the other torque transmission path can be connected to the output shaft.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
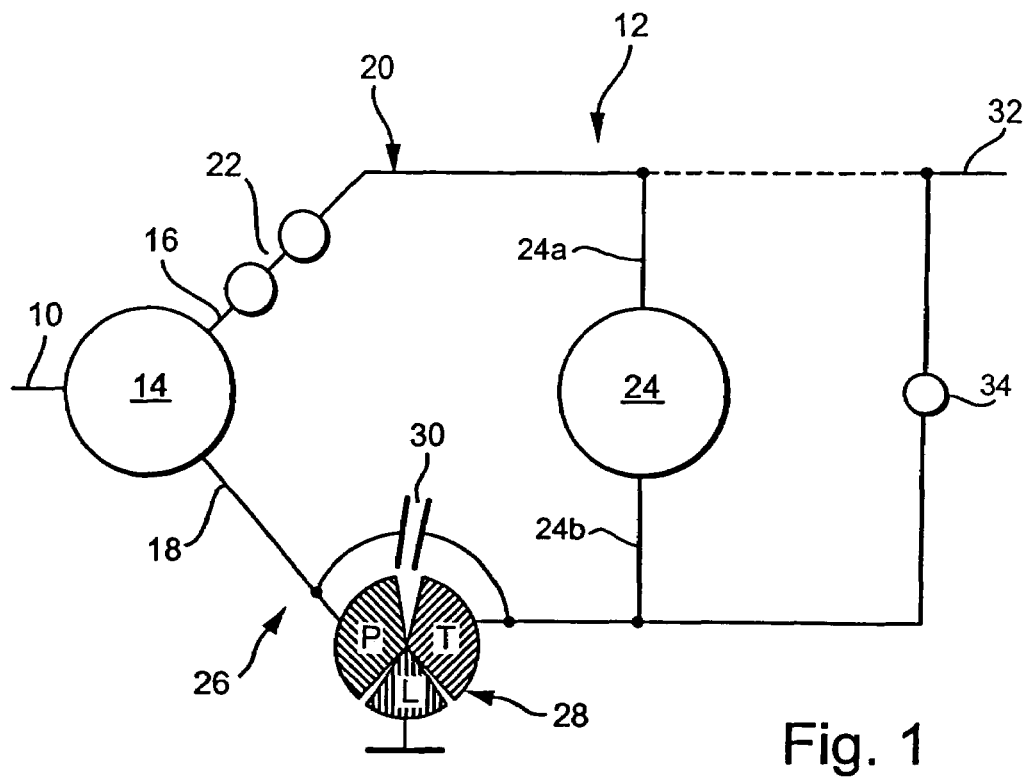
FIG. 1 is a schematic diagram of an embodiment of a power-branched continuously variable transmission in accordance with the present invention.

Referring to FIG. 1, an input shaft 10 of a transmission in accordance with the invention, designated in its entirety as 12, is rotationally driven by a drive engine (not shown), for example an internal combustion engine. A power divider transmission 14, which can be a planetary transmission, provides a connection between input shaft 10 and two driven shafts 16 and 18 of the power divider transmission. The driven shaft 16 is the input shaft of a first torque transmission path, designated in its entirety as 20, in which a transmission ratio stage 22 is positioned and which is connected to a shaft 24a of a variable speed drive unit 24. Variable speed drive unit 24 can be, for example, a belt-driven conical-pulley transmission having two pairs of conical disks that are drivingly interconnected by an endless torque-transmitting means, and in which the spacing between conical disks of the disk pairs can be varied in opposite directions, so that the transmission ratio between the shafts of the pairs of conical disks is continuously variable.

Variable speed drive unit 24 can also be a toroidal variable speed drive unit or a cone-ring transmission, where in each case the variable speed drive unit would reverse the rotational speed (negative variable transmission ratio), so that in compensation the transmission ratio stage 22 would then also be shown as a negative transmission ratio (for example, a single-step spur gear transmission ratio)

The other driven shaft 18 is the input shaft of a second torque transmission path 26, which contains a converter 28 that as illustrated is a hydrodynamic converter. Driven shaft 18 is connected to the impeller P of converter 28, whose turbine T is connected to the other shaft 24b of variable speed drive unit 24. A lockup clutch 30 is provided to lock up converter 28, and L denotes the stator of converter 28.

The shaft of the second torque transmission path 26 that is connected to the turbine T of converter 28 and to shaft 24b of variable speed drive unit 24, is connected to output shaft 32 of transmission 12 through a transmission ratio stage 34.

Figure 2:
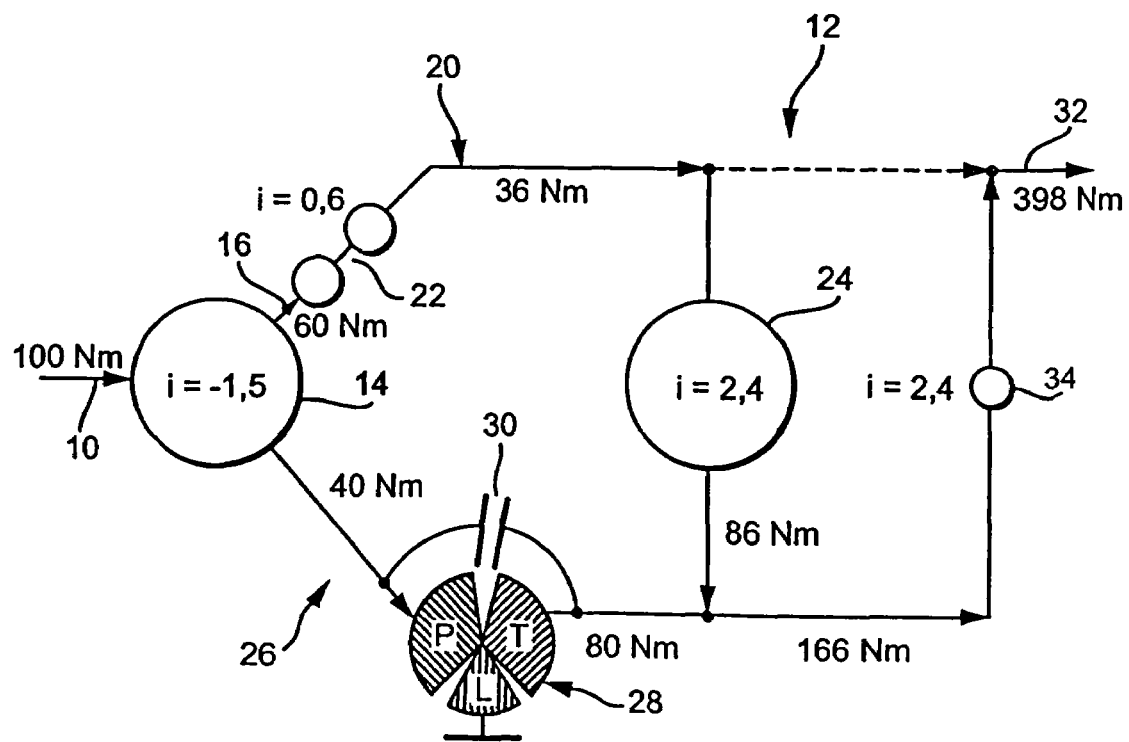
FIG. 2 shows the transmission in accordance with FIG. 1 with examples of torques and transmission ratios.

FIG. 2 shows a numerical example of transmission 12 in accordance with FIG. 1. Assume that the transmission ratio of the power divider transmission 14 or the planetary transmission set is i=−1.5, that of transmission ratio stage 22 is i=0.6, the variable speed drive unit is set at a start-up transmission ratio i=2.4, and the transmission ratio of transmission ratio stage 34 is likewise i=2.4.

If a torque of 100 Nm is present at the input shaft 10 when starting up, because of the transmission ratio i=−1.5 of the planetary transmission set that input torque is divided into 60 Nm into the first torque transmission path 20 and 40 Nm into the second torque transmission path 26. The 60 Nm in the first torque transmission path in the direction of the torque flow before transmission ratio stage 22 become 36 Nm as the result of the transmission ratio i=0.6, which is applied to the variable speed drive unit 24. As the result of the variable speed drive unit transmission ratio of i=2.4, the 36 Nm are converted to 86 Nm by variable speed drive unit 24.

If converter 28 is operated during a start-up period with a conversion factor of 2, the 40 Nm at the input side become 80 Nm at the output of the converter. That torque is added in the second torque transmission path to the 86 Nm at the output of variable speed drive unit 24 to total 166 Nm. Because of the transmission ratio i =2.4 of transmission ratio stage 34, the 166 Nm torque is increased to 380 Nm, which is applied to output shaft 32.

It should be understood that the torque and transmission ratio figures given above are merely examples, and they apply under the assumption of components that operate without losses. In practice, the values are, of course, subject to losses.

As can be seen, the input torque of 100 Nm is increased to an output torque of nearly 400 Nm, while a maximum torque of only 86 Nm is operative at variable speed drive unit 24. The design of the variable speed drive unit can therefore be correspondingly small in size, which results in less construction space and smaller losses in the variable speed drive unit.

If converter 28 is locked up, the resulting torque is 40 Nm at its output side, and hence a total of only 304 Nm at the output shaft 32.

An increase occurs in the start-up conversion of the overall transmission, from approximately 3 with the lockup clutch 30 engaged to approximately 4 when converting by means of converter 28, without variable speed drive unit 24 having to transmit a higher torque.

In summary, because of the described transmission structure the variable speed drive unit can be of a small size, and it does not have to be designed for the torque step-up of the converter. The transmission in accordance with the present invention, in which the converter is integrated into one torque transmission path of the power branching, is thus of compact construction and works highly effectively. The spread of variable speed drive unit 24 can be utilized doubly, by engaging by means of a clutch (not shown) the torque transmission path that is shown by dashed lines in FIGS. 1 and 2, and disengaging the other torque transmission path containing transmission ratio stage 34 by means of another clutch (not shown). Not illustrated is a generally present final drive transmission ratio of about 3.5 to 4.5, which is typically realized at a differential axle (not shown), and with which the wheel torque is again increased.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A power-branched continuously variable transmission, said transmission comprising:
    an input shaft and a unitary output shaft, wherein the unitary output shaft is connected with a differential axle to drive motor vehicle wheels;
    a power divider transmission for dividing an input shaft torque between two torque transmission paths, only one of which paths is connected to the output shaft;
    a variable speed drive unit positioned between and interconnecting the two torque transmission paths with each other, wherein the variable speed drive unit is a frictionally-engaged, continuously-variable transmission selected from the group consisting of a belt-driven conical-pulley transmission, a toroidal variable speed drive unit, and a cone-ring transmission; and
    a start-up converter positioned in one of the torque transmission paths between the power divider transmission and the variable speed drive unit.

2. A transmission in accordance with claim 1, wherein the start-up converter is a hydrodynamic converter.

3. A transmission in accordance with claim 1, wherein the start-up converter is an electrical machine that is operable both as a generator and as a motor.

4. A transmission in accordance with claim 2, wherein the start-up converter includes a lockup clutch.

5. A transmission in accordance with claim 1, wherein the torque transmission path that includes the start-up converter is connected to the output shaft.

6. A transmission in accordance with claim 1, wherein the torque transmission path that includes the start-up converter is connected to the output shaft through a transmission ratio stage.

7. A transmission in accordance with claim 1, wherein a transmission ratio stage is included between the power divider transmission and the variable speed drive unit in the torque transmission path that does not include the start-up converter.

8. A transmission in accordance with claim 1, wherein the power divider transmission is a planetary transmission.

9. A transmission in accordance with claim 1, wherein at least one torque transmission path is connected directly to the output shaft.

10. A transmission in accordance with claim 3, wherein the start-up converter includes a lockup clutch.

* * * * *